Patented Aug. 11, 1925.

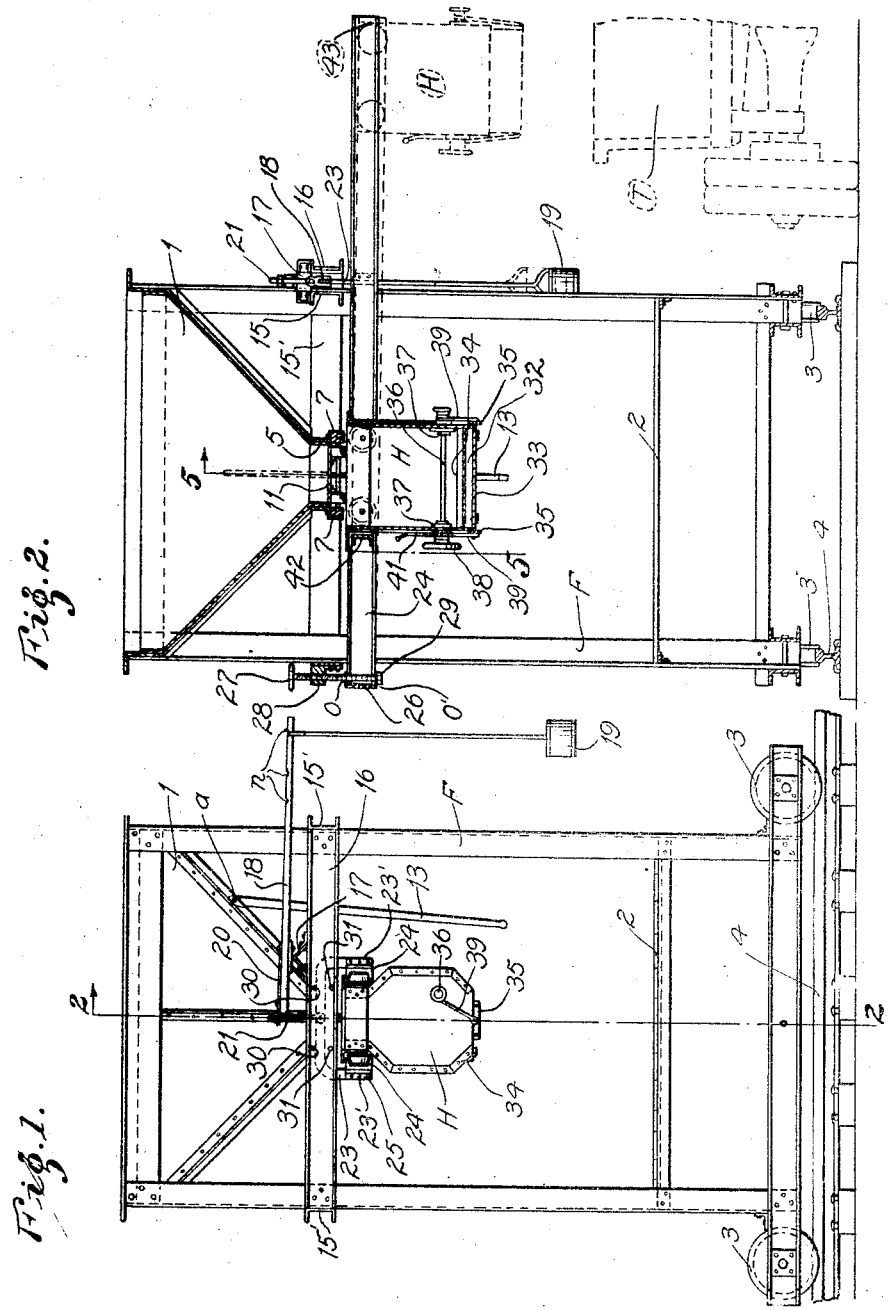

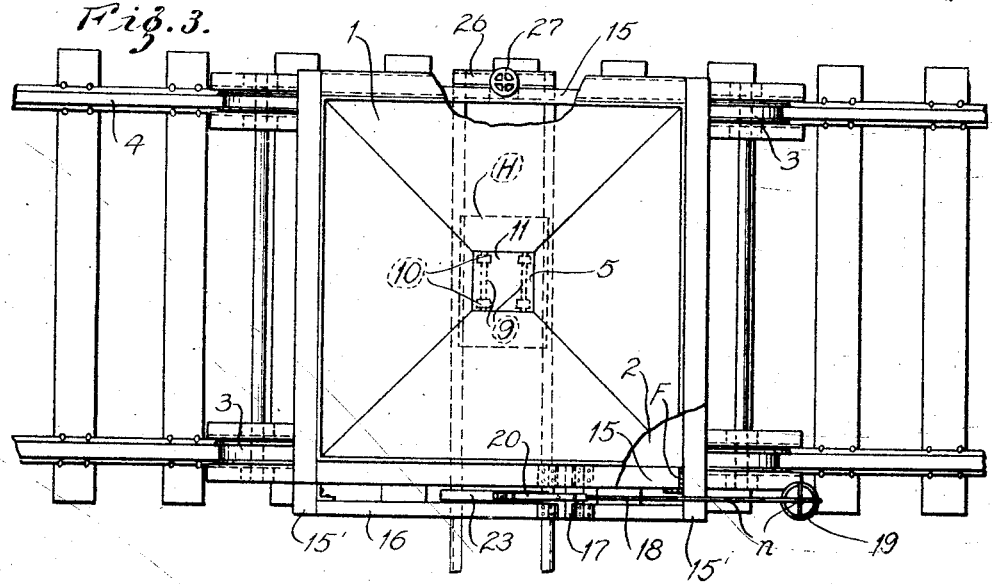

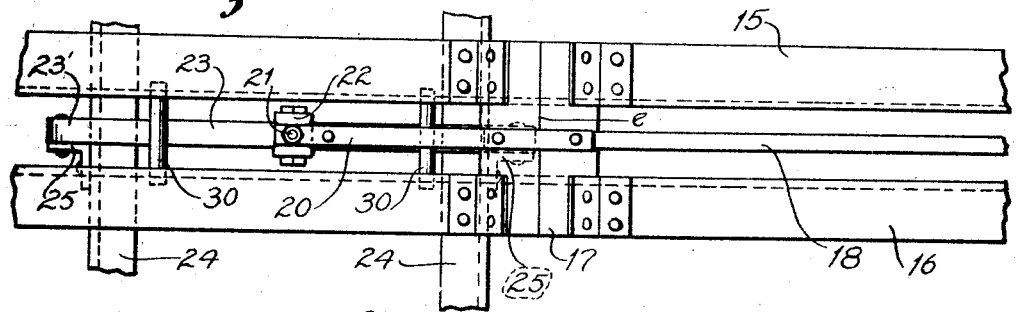
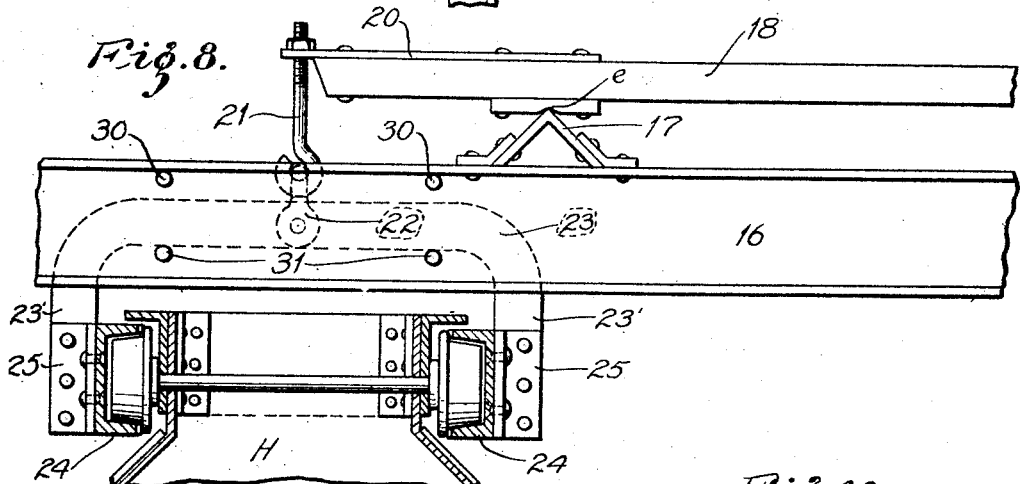
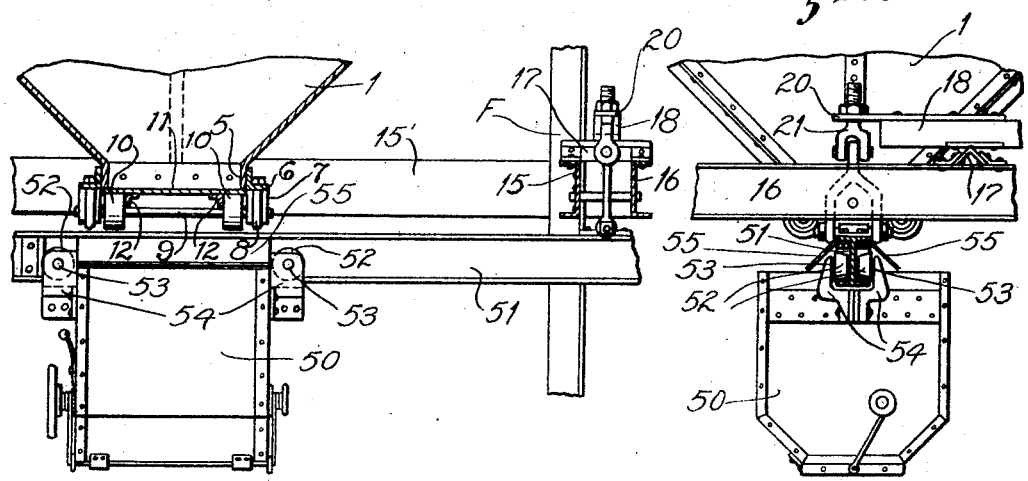

1,549,549

UNITED STATES PATENT OFFICE.

MAURICE L. HOEFFKEN, OF BELLEVILLE, ILLINOIS.

LOADING AND WEIGHING HOPPER.

Application filed August 24, 1922. Serial No. 584,033.

*To all whom it may concern:*

Be it known that I, MAURICE L. HOEFFKEN, a citizen of the United States, residing at Belleville, in the county of St. Clair and State of Illinois, have invented certain new and useful Improvements in Loading and Weighing Hoppers, of which the following is a specification.

My invention has relation to improvements in loading and weighing hoppers for handling materials, and consists in the novel features of construction more fully set forth in the specification and pointed out in the claims.

The object of the present invention is to combine a scale beam with a loading hopper so that any desired amount of material may be correctly measured in said hopper before loading the material into a truck or other carrier. A further object is to arrange the hopper on a track that automatically inclines toward the dumping end when the desired amount of material has been loaded into the hopper, said track being adjustable at one end and provided with suitable stop blocks to limit the travel of the hopper. A further object is to provide the hopper with a double gate to facilitate the discharge of the material therefrom. Further and other advantages will be better apparent from a detailed description of the invention in connection with the accompanying drawings, in which—

Figure 1 is a side elevation of my improved hopper; Fig. 2 is a vertical, middle, longitudinal section thereof taken on the line 2—2 of Fig. 1; Fig. 3 is a plan view of the invention with parts broken away; Fig. 4 is an enlarged combined sectional and side elevational view of the batch hopper mounted below the loading hopper; Fig. 5 is a detail view showing the adjustment screw for raising and lowering one end of the hopper track; Fig. 6 is a sectional view of the bottom of the loading hopper taken at right angles to Fig. 4; Fig. 7 is an enlarged plan of part of the scale beam from the short arm of which the hopper track is suspended; Fig. 8 is a side elevation of the scale beam, the track and part of the hopper being in section; Figures 9 and 10 are vertical section and side elevation respectively of a modified form of the invention.

Referring to the drawings, F represents a suitable supporting frame carrying a loading hopper 1 above, and a platform 2 below, the entire frame being mounted on wheels 3 adapted to travel on a standard gauge track 4. The loading hopper 1 terminates at the bottom in a rectangular neck 5 which is reinforced by angles 6, 6, 6', 6' secured on the outside of the neck, the angles 6, 6 having bearing blocks 7, 7 secured to them in spaced relation by U-bolts 8, 8. Journals 9, 9 are mounted in opposite blocks 7, 7, and a pair of rollers 10, 10 are mounted on each journal, said rollers supporting the hopper gate 11 and furnishing a roller bearing therefor. A pair of angles 12, 12 are secured to the bottom of the gate 11 between the rollers 10, 10, for the purpose of stiffening said gate and preventing it from bending under the weight of the superposed material in the hopper. The gate is operated by a lever 13 pivotally connected to the hopper bottom at $a$, said gate being connected to the lever by a link 14.

The frame F is provided with horizontal channels 15, 15' about in line with the neck 5 of hopper 1, the channels 15' (which are on opposite sides) being somewhat longer than channels 15 (also on opposite sides) and a channel 16 is secured between the extremities of channels 15' in spaced relation with one of the channels 15.

An angle plate 17 rests upon both channels 15 and 16, and is secured thereto about one-third their length from one end, and a scale beam 18 is fulcrumed on the edge $e$ of the angle plate. The long arm of the scale beam is provided with a series of notches $n$, $n$, $n$, for receiving a counter weight 19, while the short arm thereof is provided with a perforated plate 20, from which depends a threaded eye-bolt 21, connected by a clevis 22 to a bail 23, each side arm 23' of the bail having a rail 24 secured to it by an angle 25, said rails 24 together constituting the track for the batch or weighing hopper H. The free ends of the rails 24 extend a short distance beyond the bail 23, while the other ends of the rails are connected by a short channel 26, this end being vertically adjustable when required to maintain the rails horizontal when the hopper H is empty and in position to be loaded. This adjustment is effected by a hand screw 27 screw-seated in a bracket 28 secured to the frame F, the stem of the screw traversing openings $o$, $o'$ in the flanges of the channel 26, and a nut 29 being screwed over the end of the screw to hold the rails against downward movement. The screw 27 has sufficient clearance in the holes $o$, $o'$ to permit of a limited movement of the rails to an inclined position. Two pairs of pins 30, 30 and 31, 31 limit the rails in their movement, the bail 23 striking pins 30, 30 when raised under the influence of the counter weight 19, and said bail striking pins 31, 31 when forced down with the rails under the influence of the loaded hopper H.

The batch hopper H is provided with a discharge opening O at the bottom, an angle iron partition 32 extending from side to side of the hopper across this opening, and a pair of gates 33, 33' are adapted to close the opening O, gate 33 being hinged to the inclined bottom wall 34 of the hopper, and gate 33' being hinged to the partition 32, said gates being connected by a pair of bars 35, 35 pivotally secured to the gates at the sides thereof so that they will open and close in unison. Traversing the hopper near the side thereof toward the free end of the gates 33, 33' is a shaft 36, said shaft projecting beyond the hopper side walls and being mounted in bearings 37, 37 secured on the inside of said walls. A hand wheel 38 is mounted on one end of said shaft, and a pair of cables 39, 39 are secured to the bars 35 and to the shaft 36, said cables being wound onto the shaft to raise the gates 33, 33' when the hand wheel 38 is turned in the proper direction. A ratchet 40 on the shaft and dog 41 mounted on the hopper to cooperate with the ratchet prevent the shaft from turning to unwind the cables while permitting it to turn in the opposite direction. When the hopper H is to be dumped the dog 41 is released from the ratchet and the weight of the material in the hopper opens the gates.

In loading the batch hopper H we first bring the hopper beneath the discharge opening of the loading hopper 1, and to insure its being brought to the exact position a stop block 42 is placed between the rails 24, 24 beyond which the hopper cannot travel. The hopper H is now in place, and the counter weight 19 is adjusted for the amount of material required. The operator standing on the platform 2 now opens the gate 11 by pulling on the lever 13, and the material discharges into the hopper H from hopper 1. When the required amount of material is in the batch hopper it will overbalance the counter weight 19, and the rails 24 will tilt downwardly until the bail 23 strikes the pins 31, 31. The operator now closes the gate 11, and the hopper H runs along the rails 24 to their free end, where said hopper is arrested by a plate 43 connecting the rails. The batch hopper may now be dumped into a truck T beneath the projecting ends of the rails, which is done by simply releasing the dog 41 from ratchet 40, when the weight of the material will force the gates 33, 33' to open position (Fig. 4). The gates 33, 33' are closed by turning the hand wheel 38 in the proper direction, and the hopper pushed back to loading position, it being understood that the counter weight 19 has again raised the rails to horizontal position. The loading and dumping of the batch hopper H may now be repeated.

In Figures 9 and 10 I show a modified form of batch hopper 50 in that it rides on a single rail 51, on rollers 52 mounted in pairs on the end walls of the hopper, the rollers 52 being mounted on spindles 53 projecting from brackets 54. In order that the lower flanges of the rail do not get covered with material when the batch hopper 50 is being loaded, I provide a pair of aprons 55, 55 which are secured to the upper flanges of the rail 51 beneath the loading hopper discharge opening. These aprons are inclined outwardly, and direct the material into the batch hopper 50.

Having described my invention, I claim:

1. In combination with a supporting frame, a scale beam fulcrumed thereon, a track pivotally secured at one end to the frame and supported near the other end by the short arm of the scale beam, means for vertically adjusting the pivotally secured end, a counter weight on the long arm of the scale beam, a batch hopper having a rolling support on said track, said hopper when loaded operating to depress the end of the track last above referred to together with the short arm of the scale beam, and means for confining the movement of track and scale beam within narrow limits.

2. In combination with a supporting frame, a scale beam fulcrumed thereon, a pair of rails pivotally secured at one end on the frame, a bail connecting said rails near the opposite end, said bail having adjustable connection with the short arm of the scale beam, a counter weight on the long arm of the scale beam, a batch hopper having rolling support on said rails, said rails being adapted to oscillate with the scale beam, means for confining the oscillations of the rail between suitable limits, and means for limiting the travel of the batch hopper on the rails between predetermined limits.

3. A batch hopper, a track therefor, said hopper having a rolling support thereon, said track being pivotally secured at one end and movably supported near the other end, means for confining the movement of said movable end of the track to a limited distance when the batch hopper is loaded, and a pair of discharge gates hinged to the hopper bottom, said gates being coupled together and disposed in parallelism.

4. A batch hopper, a track therefor, said hopper having a rolling support thereon, said track being pivotally secured at one end and movably supported near the other end, means for confining the movement of said movable end of the track to a limited distance when the batch hopper is loaded, a pair of discharge gates hinged to the hopper bottom, said gates being coupled together and disposed in parallelism, and means for holding said gates in closed position.

5. A batch hopper, a track therefor, said hopper having a rolling support thereon, said track being pivotally secured at one end and movably supported near the other end, means for confining the movement of said movable end of the track to a limited distance when the batch hopper is loaded, a pair of discharge gates hinged to the hopper bottom, said gates being coupled together and disposed in parallelism, means for releasing said gates, and means for closing the same.

In testimony whereof I hereunto affix my signature.

MAURICE L. HOEFFKEN.